United States Patent
Shibata (10) Patent No.: US 10,656,702 B2
(45) Date of Patent: May 19, 2020

(54) IMAGE FORMING APPARATUS THAT MAKES A STATE TRANSITION TO ENTER A POWER SAVING STATE

(71) Applicant: KYOCERA Document Solutions Inc., Osaka (JP)

(72) Inventor: Yukihiro Shibata, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 81 days.

(21) Appl. No.: 16/024,476

(22) Filed: Jun. 29, 2018

(65) Prior Publication Data

US 2019/0004589 A1    Jan. 3, 2019

(30) Foreign Application Priority Data

Jun. 29, 2017   (JP) .................................. 2017-127597

(51) Int. Cl.
G06F 1/3234     (2019.01)
H04N 1/00       (2006.01)

(52) U.S. Cl.
CPC ....... *G06F 1/3284* (2013.01); *H04N 1/00896* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0064431 A1* | 3/2011 | Kohri | .................. | G01R 21/133 399/37 |
| 2012/0236353 A1* | 9/2012 | Nagayama | ......... | G03G 15/5004 358/1.13 |
| 2013/0094876 A1* | 4/2013 | Okunishi | ............... | G03G 15/80 399/88 |
| 2013/0120780 A1* | 5/2013 | Hamada | ................ | G06F 3/1221 358/1.13 |
| 2015/0311805 A1* | 10/2015 | Yamashita | ........ | H02M 3/33507 363/21.01 |

(Continued)

FOREIGN PATENT DOCUMENTS

JP    2008-052071 A    3/2008

*Primary Examiner* — Raymond N Phan
(74) *Attorney, Agent, or Firm* — Hawaii Patent Services; Nathaniel K. Fedde; Kenton N. Fedde (57) ABSTRACT

To keep up with achievement of the TEC value and suppressing the wear-out of hardware. An image forming apparatus of the present disclosure, which is configured to transit, after an elapse of a sleep-transition time, to enter a power-saving state in which power supply destinations are limited when compared to a normal state, includes a power amount prediction unit and an extension control unit. The power amount prediction unit acquires, whenever a state-transition is made, a power-consumption amount during an immediate preceding power-saving state to calculate a predicted power-consumption amount in a specific period based on the power-consumption amount. The extension control unit gives priority to the sleep-transition to enter the power-saving state if the predicted power-consumption amount exceeds the TEC value corresponding to the specific period, while extends the sleep-transition time if the predicted power-consumption amount fails to exceed the TEC value corresponding to the specific period.

5 Claims, 5 Drawing Sheets

(56) References Cited

U.S. PATENT DOCUMENTS

2016/0065076 A1* 3/2016 Yamashita .............. H02M 1/34
  363/21.12
2018/0181189 A1* 6/2018 Megawa ............... G06F 1/3287

* cited by examiner

IMAGE FORMING APPARATUS THAT MAKES A STATE TRANSITION TO ENTER A POWER SAVING STATE

INCORPORATION BY REFERENCE

This application is based on and claims the benefit of priority from Japanese Patent Application No. 2017-127597 filed on Jun. 29, 2017 the contents of which are hereby incorporated by reference.

BACKGROUND

The present disclosure relates to an image forming apparatus that makes a state transition between a normal state and a power saving state.

In recent years, image forming apparatuses such as copying machines and multifunction peripherals are required to have low power consumption, and therefore, in addition to the normal state under which a major job such as a printing job or the like is to be executed, is provided with a function to perform transition to the power saving state under which power consumption is made reduced. In the normal state, the image forming apparatus, when the sleep transition time has elapsed without being operated, turns off a power supply to a printing unit, a display unit, and the like, to transit to enter the power saving state.

In the power saving state, when a print job is accepted or when an operation unit is operated, the image forming apparatus turns on the power supply to the printing unit, the display unit, and the like, and performs restoration from the power saving state to the normal state. However, it is inefficient to perform restoration to the normal state frequently in a short time. Therefore, in the case of frequent restoration from the power saving state in a short time within a predetermined period, a technique has been proposed in which the sleep transition time is set to be longer after an elapse of the predetermined period.

As an index of such energy saving, the TEC value of each image forming apparatus is made public. The TEC value indicates the conceptual power consumption (kWh) for conceptual one week. The conceptually one week is made up of five business working days in which operation and sleep/off are repeated, and two business holidays in which sleep/off state remains unchanged.

SUMMARY

An image forming apparatus of the present disclosure, which makes a transition to enter a power saving state in which power supply destinations are limited when compared to a normal state after an elapse of sleep transition time. The image forming apparatus includes a power amount prediction unit and an extension control unit. The power amount prediction unit acquires, whenever a state transition is made, a power consumption amount that is consumed in the normal state that is held immediately before the state transition or in the power saving state that is held immediately before the state transition and calculates a predicted power consumption amount in a specific period based on the acquired power consumption amount. The extension control unit gives a priority to making a sleep transition if the predicted power consumption amount exceeds a TEC value corresponding to the specific period and extends the sleep transition time if the predicted power consumption amount does not exceed the TEC value corresponding to the specific period.

DETAILED DESCRIPTION

Hereinbelow, with reference to the drawings, an embodiment of the present disclosure will be described in detail. It is to be noted that the same reference numerals are given to the configurations showing similar functions.

Figure 1:
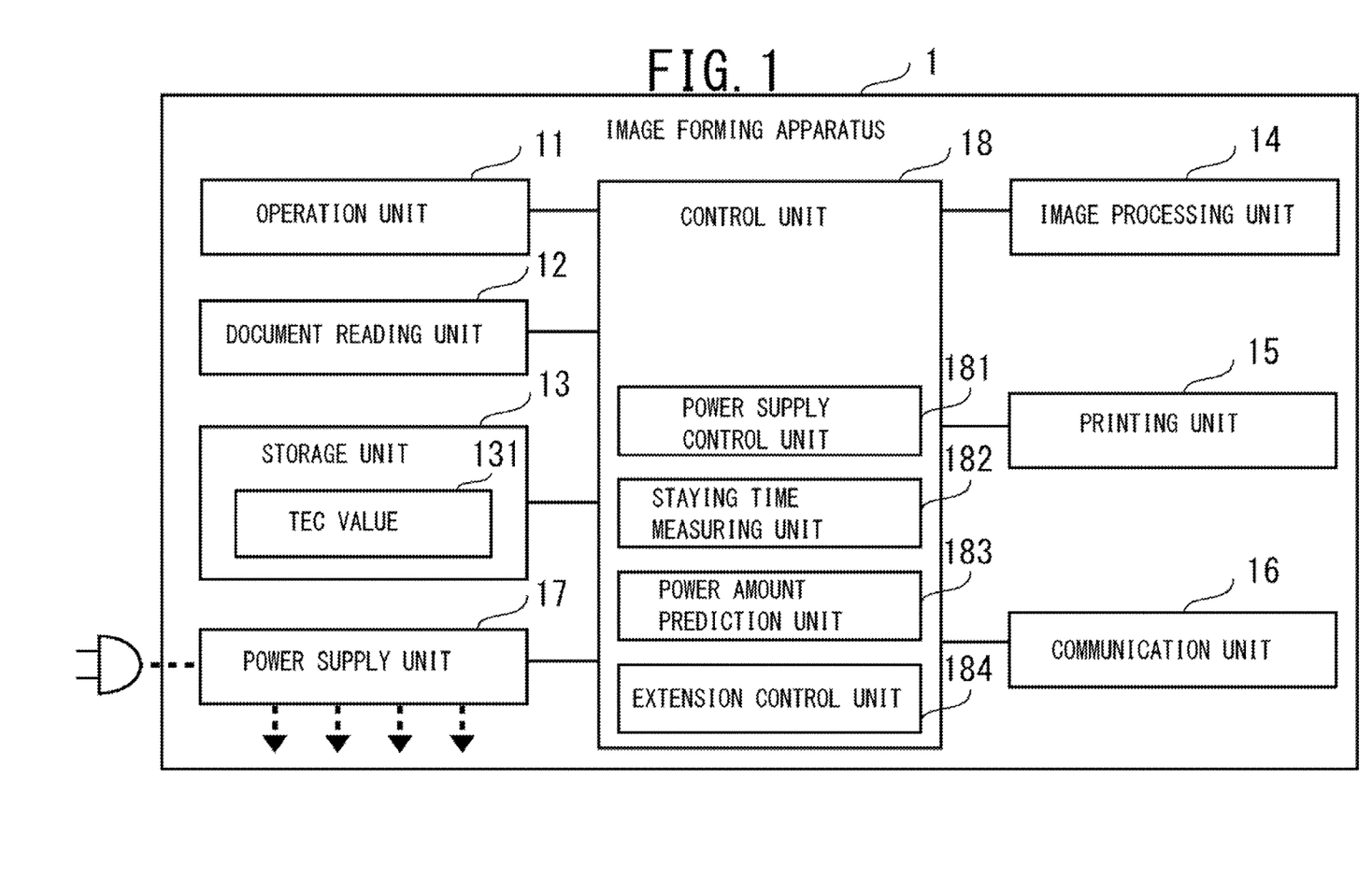
FIG. 1 is a functional block diagram showing a schematic configuration of an image forming apparatus according to an embodiment of the present disclosure.

Referring to FIG. 1, an image processing apparatus 1, which is in the form of a copying machine, a multifunction peripheral, or the like, includes an operation unit 11, a document reading unit 12, a storage unit 13, an image processing unit 14, a printing unit 15, a communication unit 16, and a power supply unit 17. It is to be noted that in FIG. 1, solid lines indicate signal lines, while dotted lines indicate power supply lines.

The operation unit 11 includes various operation keys, a touch panel, and other operation associated elements which are configured for performing various settings and operation instructions.

The document reading unit 12 includes a scanner that is made up of an exposure lamp, a CCD sensor, and other components. The document reading unit 12 reads a document placed on a platen glass or a document fed from a document feeding device, acquires image data, and outputs the acquired image data to the printing unit 15.

The storage unit 13 is a storage device such as a semiconductor memory, an HDD, or the like. In the storage unit 13, the image data acquired by reading the document at the document reading unit 12 is stored, and various types of management information are stored. In addition, in the storage unit 13, a TEC value 131 of the image forming apparatus 1 is stored.

The image processing unit 14 is a device that performs predetermined image processing on the image data, and image processing such as rotation processing, enlargement/reduction processing, gradation adjustment, density adjustment and the like are performed, for example.

The printing unit 15 is provided with an image forming unit including, for example, a photosensitive drum, a charging unit, an exposure unit, a developing unit, a transfer unit, a cleaning unit, and a fixing unit, and records the formed image on a recording paper sheet.

The communication unit 16 has a function of transmitting and receiving various data to and from peripheral devices such as personal computers and other image forming apparatuses via a network such as a LAN. In addition, the communication unit 16 is configured to be connectable to the Internet via the network and a router. Thus, the communication unit 16 has a function of transmitting and receiving various data to and from various communication devices connected to the Internet.

The communication unit 16 receives a network request packet or job processing packet from another device via the network. The network request packet is a packet for confirming the device status in SNMP or the like. Upon receipt of the network request packet, the communication unit 16 processes the packet and makes a response that includes, for example, the name of the image forming apparatus and its installation location, and the like. The job processing packet is a packet that causes the image forming apparatus 1 to execute a job process, the job being a print job or the like.

The power supply unit 17 converts the commercial alternating current power supply AC into a direct current voltage DC usable at each unit of the image forming apparatus 1 and supplies the converted direct current voltage DC to each unit of the image forming apparatus 1 as a power supply.

The control unit 18 is in the form of an arithmetic processing circuit such as a microcomputer including a CPU, a ROM, a RAM and the like, or the similar processor. In the ROM, a control program for controlling the operation of the image processing apparatus 1 is stored. The control unit 18 reads the control program stored in the ROM and develops the control program in the RAM, thereby controlling the entire apparatus according to various instruction information input from the operation unit 11. The control unit 18 also functions as a power supply control unit 181, a staying time measuring unit 182, a power amount prediction unit 183, and an extension control unit 184.

Figure 2:
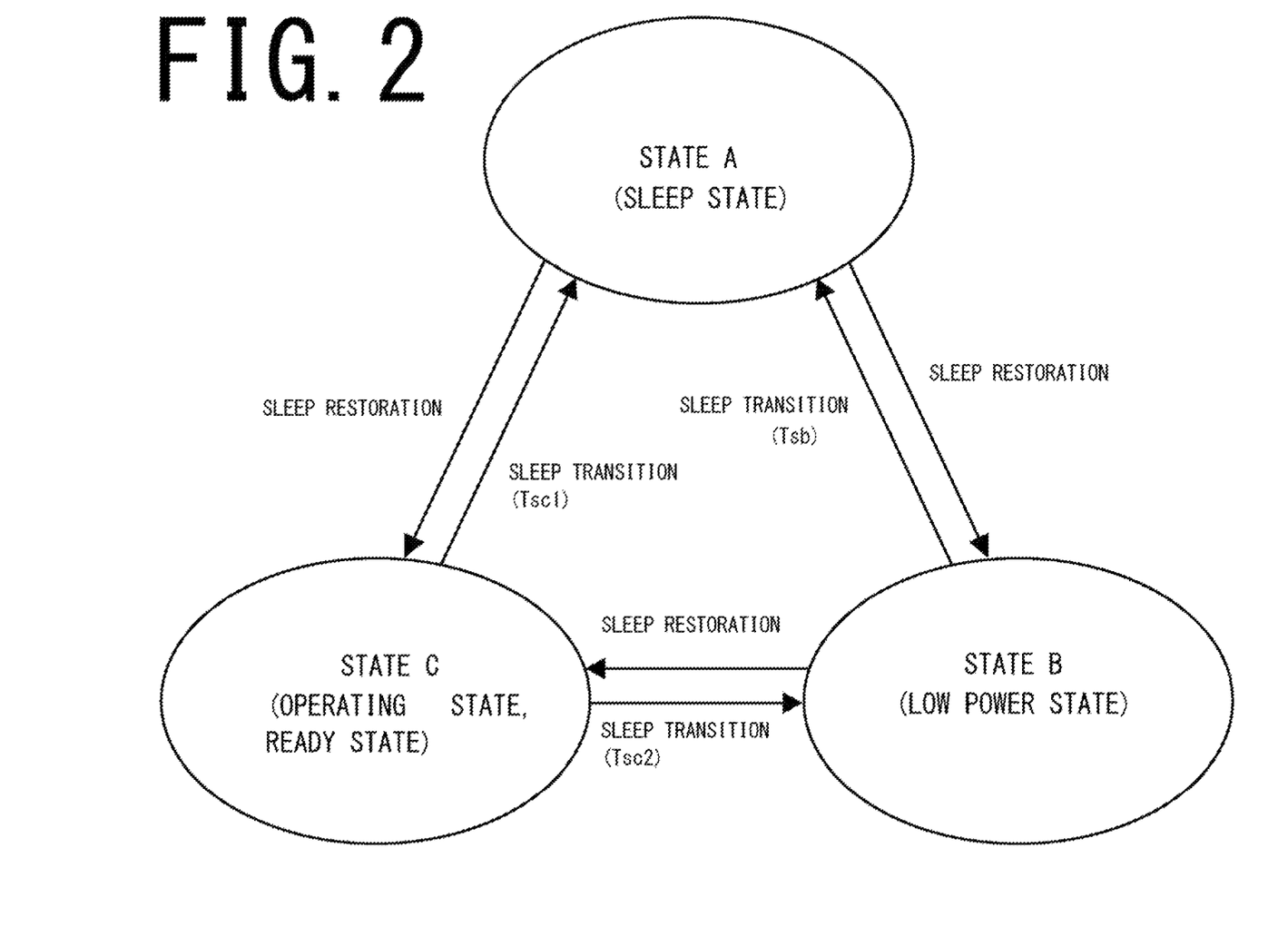
FIG. 2 is a state transition diagram of the image forming apparatus shown in FIG. 1.

The power supply control unit 181 causes the power supply unit 17 to supply power to each unit of the image forming apparatus 1 and stop the supply of power to each unit. There are a state A, a state B, and a state C that are shown in FIG. 2 as to the state of power supply to each unit by the power supply control unit 181.

The State A is a so-called sleep state, under which power supply destinations are the most limited mode. Under the state A, only power is supplied that is necessary for a detection of an operation to the operation unit 11 and the reception standby of the communication unit 16, and power supplies to a liquid crystal display unit, the document reading unit 12, and the printing unit 15 are stopped.

The State B is a so-called low power state, under which the power supply destinations are limited, not as much as the State A. Under the state B, power is supplied to the communication unit 16 in addition to the power supply necessary for a detection of an operation to the operation unit 11, and power supplies to the liquid crystal display unit, the document reading unit 12, and a recording unit are stopped. Under the state B, the communication unit 16 can transmit various types of image forming apparatus information and the like in response to a network request packet received from another device via the network.

The state C is a so-called normal state under which the power supply destinations are not limited, and power is supplied to all units of the image forming apparatus 1. The normal state includes an operating state in which main functions such as an image forming operation and the like are being executed and a ready state that is ready to switch immediately to the operating state in which a fixing unit is warmed up to the ready temperature. Under the state C, power is supplied to all the liquid crystal display unit, the document reading unit 12, the printing unit 15, and the communication unit 16.

Under the state A, if a sleep restoration event to the state C occurs, the event being, for example, an operation of the operation unit 11 and a reception of the job process packet by the communication unit 16, the image forming apparatus 1 makes a sleep restoration to enter the State C. In addition, under the state A, if the communication unit 16 receives the application request packet as the sleep restoration event to enter the state B, the communication unit 16 under the state A makes the sleep restoration to enter the state B.

Asleep transition is made from the state C to the state A or the state B. During a sleep transition time Tsc1 that ranges from the state C to the state A, if the communication unit 16 does not receive the network request packet and the job processing packet and concurrently a state continues under which no manipulation operation and no image forming operation are performed, the sleep transition results in the state A. In the case where an elapse time measured from the time when the communication unit 16 completes the last network request packet processing does not exceed a sleep transition time Tsc2 that ranges from the state C to the state B, even if the state continues under which no manipulation operation and no image forming operation are performed during a sleep transition time Tsc1, a sleep transition is made from the state C to the state B. In other words, though no manipulation operation and no image forming operation are being performed, so long as the communication 16 is in operation based on the network request packet, a transition is made from the state C to the state B.

Under the state B, if a sleep restoration event for the state C occurs, the event being, for example, a manipulation of the operation unit 11 and a reception of the job process packet by the communication unit 16, the image forming apparatus 1 makes a sleep restoration to enter the state C. Under the state B, during a sleep transition time Tsb from the state B to the state A, if the communication unit 16 does not receive the network request packet without occurring the sleep restoration event for the state C, a sleep transition is made to enter the state A.

The sleep transition time Tsc1 for the sleep transfer from the state C to the state A, the sleep transition time Tsc2 for the sleep transition from the state C to the state B, and the sleep transition time Tsb for the sleep transition from the state B to the state A can be changed from their factory default values to arbitrary set values through manipulating the operation unit 11.

The staying time measuring unit 182 measures state staying times Ta, Tb, and Tc during which the states A, B, and C, respectively, are being held. The staying time measuring unit 182 acquires, whenever a state transition is made, a time at the time of state transition as a state start time of a current state and a state end time of the immediately preceding state. Then, the staying time measuring unit 182 calculates the state staying time in the immediately preceding state by subtracting the state end time of the immediately preceding state from the state start time of the current preceding state.

The power amount prediction unit 183 calculates a power consumption amount of the state staying time in the immediately preceding state measured by the staying time measuring unit 182 based on set power consumption amount per unit time of each state which are obtained from the design value, the measured value, and more. The set power consumption amount of each state may be stored in advance in the storage unit 13, the ROM, or the like. Subsequently, the power amount prediction unit 183 accumulates the power consumption amount in each state whenever calculating the power consumption amount of each state to calculate a cumulative power consumption amount. Then, the power amount prediction unit 183 predicts today's final predicted power consumption amount based on the cumulative power consumption amount.

The extension control unit 184 determines whether the predicted power consumption amount value is likely to exceed the TEC value 131 based on the predicted power consumption amount calculated by the power amount prediction unit 183. Then, if the TEC value 131 is unlikely to be exceeded, a sleep transition time is extended in a case of frequent repetitions of sleep transition and sleep restoration in a short time.

Next, with reference to FIG. 3, a flow of the state transition process of the image forming apparatus 1 will be described in detail.

If the power supply control unit 181 causes the power supply unit 17 to transit its power supply state (step s11), the staying time measurement unit 182 acquires the current time as a state start time of the current state and concurrently as a state end time of the immediately preceding state (Step s12). It is to be noted that the state start time of the immediately preceding state has already been acquired at the preceding state transition.

Subsequently, the staying time measuring unit 182 calculates the state staying time in the immediately preceding state by subtracting the state start time of the immediately preceding state from the state end time of the immediately preceding state (step s13).

Subsequently, the power amount prediction unit 183 calculates the power consumption amount in the immediately preceding state (step s14). The power consumption amount in the immediately preceding state can be calculated from the preset power consumption amount per unit time preset for each state×the state staying time in the immediately preceding state.

Subsequently, the power amount prediction unit 183 accumulates the calculated power consumption amounts to calculate the cumulative power consumption amount (step s15). The cumulative power consumption amount is accumulated every time the power consumption amount is calculated and is reset every day.

Subsequently, the power amount prediction unit 183 calculates the today's predicted power consumption amount (step s16). The predicted power consumption amount is calculated by (cumulative power consumption÷today's elapse time)×set operation time (for example, eight hours which is a working time or the like). The predicted power consumption amount indicates today's final predicted power consumption amount. The predicted power consumption amount may be calculated, instead of every time the state is transited, every time a predetermined time period such as N hour (N is a natural number) elapse.

In such a way, this processing completes. The power supply control unit 181 causes the above processing to execute in a repeated manner whenever the power supply state transits.

Figure 4:
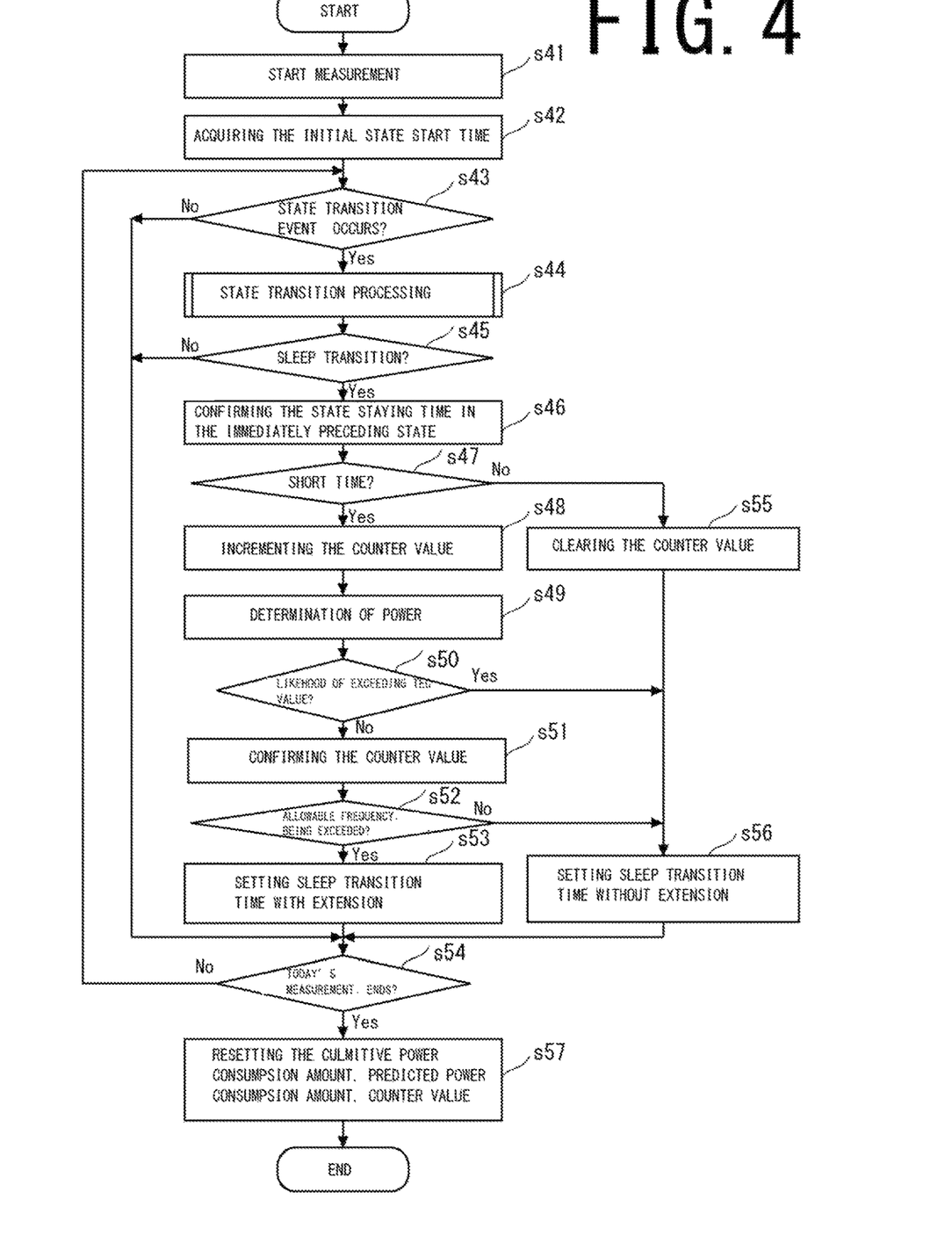
FIG. 4 is a flowchart showing a flow of extension control processing for extending the sleep transition time of the image forming apparatus shown in FIG. 1.

Next, with reference to FIG. 4, a description will be made in detail as to a flow of the sleep transition time extension control processing of the image forming apparatus 1.

If the measurement of the predicted power consumption is started (step s41) by, for example, an arrival of the set working start time or turning on the image forming apparatus 1, the staying time measuring section 182 acquires the current state as a state start time of an initial state (step s42). The initial state is the first power supply state of the day.

Subsequently, the staying time measuring unit 182 determines whether a state transition event that causes the power supply control unit 181 to transit to enter the power supply state occurs (step s43). The state transition event, which is an event that triggers sleep restoration or sleep transition, is generated based on, for example, the manipulation of the operation unit 11 being made or not, the image forming operation being made or not, or the packet being received or not.

Figure 3:
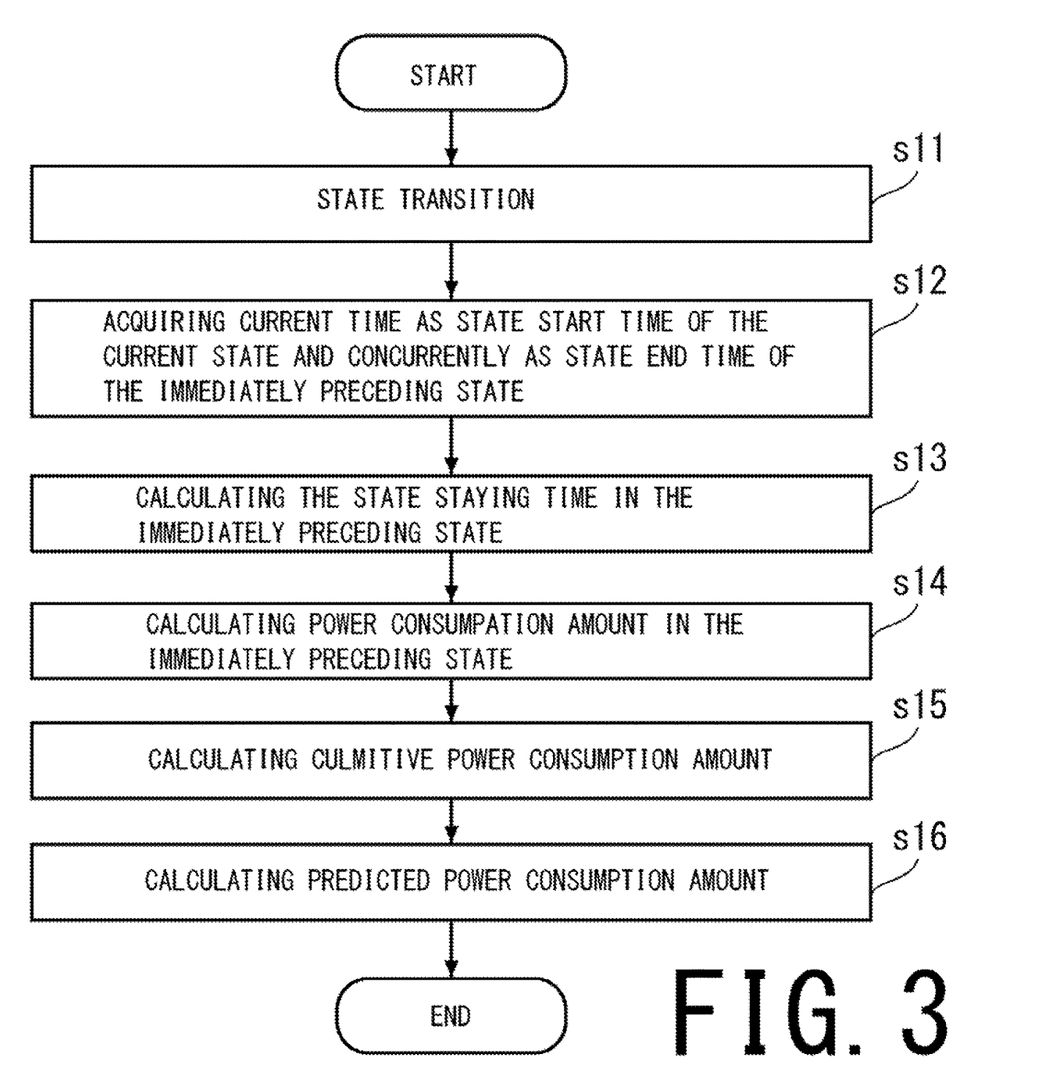
FIG. 3 is a flowchart showing a flow of processing for calculating the predicted power consumption amount of the image forming apparatus shown in FIG. 1.

If a state transition event occurs (Yes in step s43), the state transition processing that ranges from step s11 to step s16 shown in FIG. 3 is executed (step s44). As a result, the state staying time in the current state is measured, and the cumulative power consumption amount and today's predicted power consumption amount are updated.

Subsequently, the extension control unit 184 determines whether the state transition is the sleep transition (step s45). For example, if the state transition is made from the state B to the state A, from the state C to the state A, and from the state C to the state B which are shown in FIG. 2, such transitions are determined to be the sleep transition. The other transitions are determined to be the sleep restoration.

In the case of the transition to sleep (Yes in step s45), the extension control unit 184 confirms the state staying time in the immediately preceding state acquired in step s13 shown in FIG. 3 (step s46) and determines whether the state staying time is a short time (Step s47). For example, if the state staying time in the immediately preceding state is less than a threshold time, the extension control unit 184 determines that it is a short time, while if the state staying time in the immediately preceding state is equal to or more than the threshold time, the extension control unit 184 can determine that it is not a short time. The threshold time may be provided for each state as a setting value for determining whether each state staying time is short.

If a short time is determined (Yes in step s47), that is, if the state staying time is less than the threshold time, the extension control unit 184 increments a counter value for the immediately preceding state (step s48). The counter value is available as a counter value for the state B and a counter value for the state C and is used to count a frequency of that the power saving state in which the state staying time is the short time appears in succession.

On the other hand, if it is not the short time (No in step s47), that is, if the state staying time is equal to or longer than the threshold time, the extension control unit 184 clears the counter value of the immediately preceding state (step s55).

After incrementing the counter value, the extension control unit 184 performs a power determination using the TEC value 131 (step s49). In the power determination, a comparison is made between today's predicted power consumption amount calculated in step s16 shown in FIG. 3 and a daily TEC value 131*a* that is obtained by converting the TEC value 131 on a daily basis. Since the TEC value 131 indicates a conceptual weekly power consumption including five working day and two off duty days, the TEC value 131*a* per working day may be calculated by TEC value 131÷5 days, for example.

If the result of the power determination indicates that the predicted power consumption amount is determined not likely to exceed the daily TEC value 131*a* (No in step s50), that is, if the predicted power consumption amount is less than the daily TEC value 131*a*, the extension control unit 184 confirms the counter value of the immediately preceding state (step s51).

Then, the extension control unit 184 makes a comparison between the counter value of the immediately preceding state and an allowable frequency in the immediately preceding state. The allowable frequency is prepared for each of the state B and the state C and is a setting value indicating the allowable frequency of each state.

If the counter value for the immediately preceding state exceeds the allowable number (Yes in step s52), the extension control unit 184 sets the sleep transition time of the immediately preceding state to be extended (step s53). Thus, the sleep transition time of the immediately preceding state is extended, which makes it possible to suppress the number of turning-on and turning-off of the power source in conjunction with the sleep transition and the sleep restoration.

If a with-extension is set, an extension time α is added to the sleep transition time of the immediately preceding state. An addition of the time α may be made whenever the with-extension is set. In addition, instead of adding the extension time α, the sleep transition time of the immediately preceding state may be weighted with the extension time α.

In addition, there are two types of sleep transition time of the state C; a sleep transition time Tsc1 to transit to enter the state A and asleep transition time Tsc2 to transit to enter state B. In this case, the extension control unit 184 may extend the sleep transition time corresponding to a state after the transition to sleep if the with-extension is set. For example, if the state after the transition to the sleep state is the state B, the sleep transition time Tsc2 to transit to enter the state B is set to be extended. If the counter value for the state C exceeds the allowable frequency, the extension control unit 184 extends the sleep transition time corresponding to the sleep transfer destination (state A or state B), which has the most sleep transition count indicated by the counter value. In other words, if there are a plurality of destinations of the sleep transition under the power saving state, the extension control unit 184 may select one or more destinations of the sleep transition to extend the sleep transition time based on the sleep transition history so far.

On the other hand, if today's predicted power consumption amount is determined to be likely to exceed the daily TEC value 131a (Yes in step s50), the extension control unit 184 sets the sleep transition time in the immediately preceding state to the without-extension (step s56). The reason is that to achieve the TEC value 131, top priority must be given to the sleep transition to enter the state B or the state A which are the power saving state.

Also, if the counter value is cleared (step s55) or the counter value is equal to or less than the allowable frequency (No in step s52), the extension control unit 184 sets the sleep transition time of the immediately preceding state to the without-extension (step s56).

If the without-extension is set, the sleep transition time of the immediately preceding state becomes the set value. Therefore, if the sleep transition time of the immediately preceding state has been extended by the extension time α, the sleep transition time of the immediately preceding state becomes the originally set sleep transition time.

Upon completion of setting an extension of sleep transition, the extension control unit 184 determines whether today's measurement has ended (step s54). For example, if the measurement end time or the work closing time is reached, it is possible to determine today's measurement end. If today's measurement has not ended (No in step s54), the processing returns to step s43.

Upon end of today's measurement (Yes in step s54), the extension control unit 184 resets the cumulative power consumption amount, the predicted power consumption amount, and the counter value which are used for today's measurement (step s57) and this processing completes.

It is to be noted that if the state transition event has not occurred (No in step s43) or the state transition is not the sleep transition (No in step s45), that is, in the case of the sleep restoration, the extension control of the sleep transition time is not executed, the processing goes to step s54 for determining whether the today's measurement completes.

It is to be noted that the counter values in the states B and C are not cleared if the state staying time is not the short time (No in step s47) or until the timing when the today's measurement ends (Yes in step s54). Therefore, if today's predicted power consumption is likely to exceed the daily TEC value 131a (Yes in step s50), the counter values of the state B and the state C by the extension control unit 184 is retained.

Then, the counter values of the retained state B and state C are continuously incremented each time the state staying time in a short time is repeated. In other words, the extension of the sleep transition time is suspended until today's estimated power consumption does not exceed the daily TEC value 131a. Therefore, if the power saving state continues and today's predicted power consumption does not exceed the daily TEC value 131a (No in step s50), the extension control unit 184 can extend immediately the sleep transition times of the states B and C based on the counter values of the state B and the state C.

Figure 5:
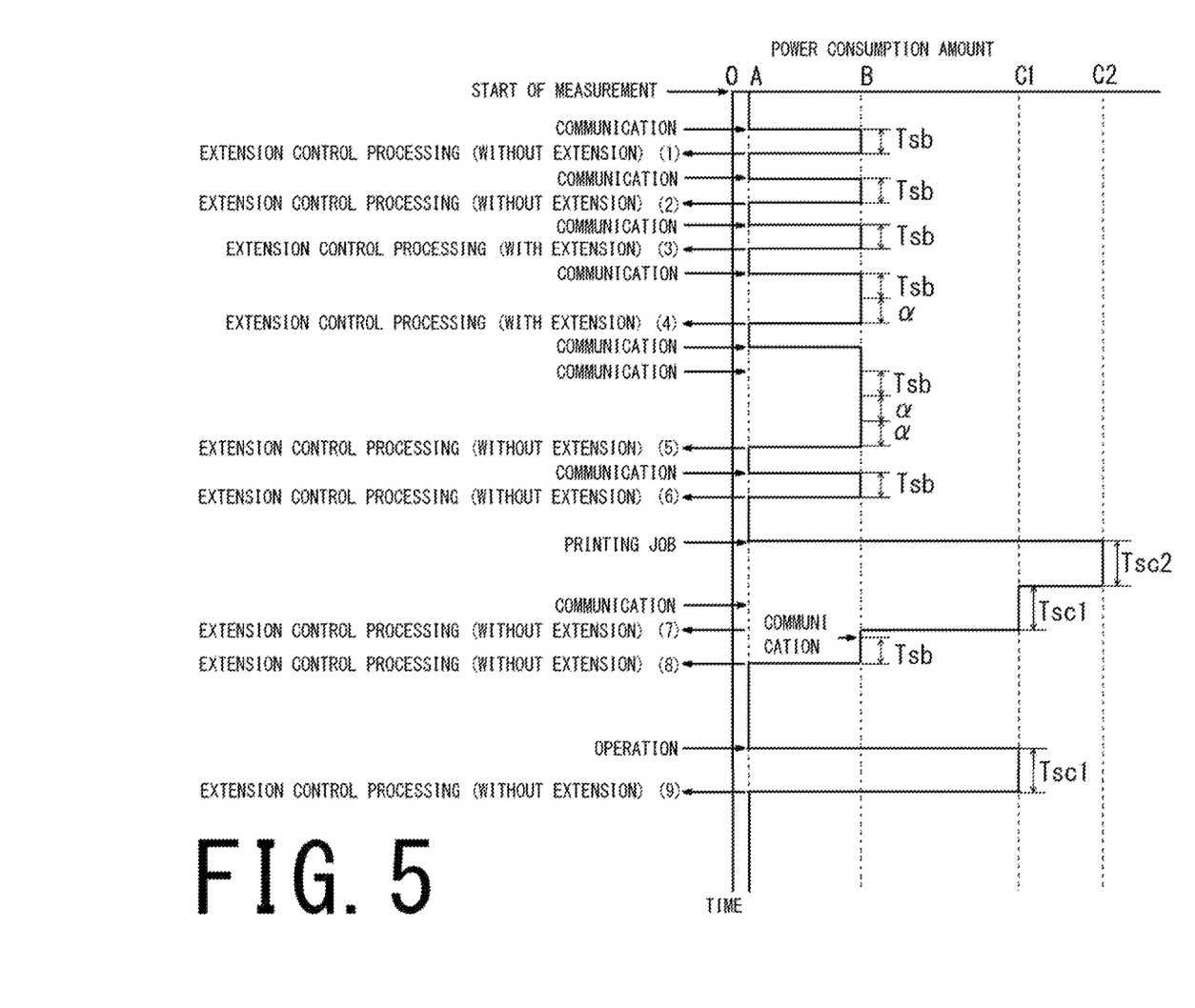
FIG. 5 is a diagram showing the relationship between the power consumption amount and the state transition of the image forming apparatus shown in FIG. 1.

FIG. 5 is a diagram showing a relationship between the power consumption amount and the state transition. The horizontal axis shows the scale of state A, state B, state C 1 which is a ready state, and state C3 which is an operation state. In FIG. 5, sleep transits (1) to (9) occur, and the extension control unit 184 executes the extension control processing for each of the states. Here, the allowable number of states B is set to 2 times. Therefore, in the extension control processing for the sleep transitions (1) and (2), even though the state staying time in the state B is short, since the counter value of the state B is 2 which does not exceed the allowable frequency, both extension control processing is set to the without-extension.

On the other hand, in the extension control process for the sleep transition (3), the counter value of the state B is 3 which exceeds the allowable number of times, and an extension of time is set. In other words, the sleep transition time is extended for the power saving state in which the frequency of consecutive short state staying times exceeds the allowable frequency. As a result, in the extension control process for the sleep transition (4), it is determined whether the staying time is a short time in a state where the state staying time in the state B has reached the sleep transition time Tsb+the extended time α in the state B. If the time is shorter than the threshold time, the extension time α is further added as shown in (5). That is, while the predicted power consumption does not exceed the daily TEC value 131a, whenever the frequency of the power saving state in which the state staying time has continuously been shortened exceeds the allowable frequency, the sleep transition time becomes long. Therefore, it is possible to reduce the on/off frequency of the power supply.

If there is a communication by the application request packet after a transition to enter the state B, a sleep transition is made to enter the state A after the communication processing ends and after the elapse of the sleep transition time Tsb+2 extension time α. In the extension control processing (5), the state staying time in the state B is determined not to be the short time and is set without an extension of time. Also, the counter value of the state B is cleared. In the extension control process (6), the state staying time in the state B is determined again as a short time, but the counter value of the state B is 1 which is less than the allowable number of times of the state B, resulting in that no extension is set.

In addition, in the state C, there is a difference between the power consumption in the operating state and the power consumption in ready state, the staying time measuring part 182 may measure the state staying time in the operating state and the state in the ready state as Tc1 and Tc2, respectively. Then, the power amount prediction unit 183 calculates the power consumption amount in each of the state staying time Tc1 of the operating state and the state staying time Tc2 based on the preset stored power consumption amounts in the operating state and the ready state and accumulates to the accumulated power consumption amount. Thereby, it is possible to improve the accuracy in calculating the power consumption amount.

As described above, the image forming apparatus 1 of the present embodiment is the image forming apparatus 1 that transits to enter the power saving state in which the power supply destinations are limited when compared to the normal state after the elapse of the sleep transition time. The image forming apparatus 1 includes the power amount prediction unit 183 and the extension control unit 184. The electric energy amount prediction section 183 acquires the power consumption amount consumed up to the immediately preceding normal state or power saving state each time the state transits and calculates the predicted power consumption amount in the specific period based on the power consumption amount. If the predicted power consumption amount exceeds the TEC value 131 corresponding to the specific period, the extension control unit 184 gives priority to sleep transition to enter the power saving state, while if the predicted power consumption amount does not exceed the TEC value 131 corresponding to the specific period, the extension control unit 184 extends the sleep transition time. As a result, the image forming apparatus 1 extends the sleep transition time within a range not exceeding the TEC value 131, which makes it possible to achieve both the achievement of the TEC value 131 and the suppression of the wear of hardware.

In the typical technique described above, there is a problem that the power consumption of the image forming apparatus may exceed the TEC value by setting the sleep transition time to be long. Also, frequent transitions between the normal state and the power saving state cause the frequency of turning on and off to its upper limit, resulting in wear of hardware. However, according to the present disclosure, it is possible to achieve both the achievement of the TEC value and the suppression of the wear of hardware.

It is to be noted that in the above description, the power amount prediction unit 183 calculates the power consumption amount of each state based on the set power consumption amount of each state. However, it may be possible to install a power measuring device that measures actual power consumption to each part of the power supply destinations of the power supply unit 17 to measure an actual power consumption amount in each state.

In addition, in the power determination described above, the predicted power consumption per day is compared with the TEC value 131 per day, but the present disclosure is not limited to this. For example, the predicted power consumption amount in a per specific period such as an or every thirty minutes may be calculated and compared with the daily TEC value 131*a* corresponding to a specific period such as per hour or per half hour.

In addition, in the above description, the power saving state includes two states, the state A in which the power supply destinations of the power supply unit 17 are most limited and the state B in which the power supply destinations are partially limited, but multi-stage transition is available depending on the limitation degree of the power supply destinations. In this case, the larger the degree of limitation of the power supply destinations is, the smaller the allowable number of times may be set. Since the power saving is large as the degree of limitation of the power supply destination is larger, the transition to the sleep state is facilitated. Also, the larger the restriction degree of the power supply destination is, the more system dependent background processing such as network communication is performed without depending on the user.

The present disclosure is not limited to the above-described embodiments, and needless to say, various modifications can be made without departing from the spirit of the present disclosure.

What is claimed is:

1. An image forming apparatus that makes a state transition to enter a power saving state in which power supply destinations are limited when compared to a normal state after an elapse of sleep transition time, the image forming apparatus comprising:

a power amount prediction unit that acquires, whenever the state transition is made, a power consumption amount that is indicative of an amount of consumed power in the normal state that is held immediately before the state transition or in the power saving state that is held immediately before the state transition, the power amount prediction unit being configured to calculate a predicted power consumption amount in a specific period based on the acquired power consumption amount;

an extension control unit that gives a priority to making a sleep transition to enter the power saving state if the predicted power consumption amount exceeds a TEC value corresponding to the specific period and that extends the sleep transition time if the predicted power consumption amount does not exceed the TEC value corresponding to the specific period; and a staying time measuring unit that measures a state staying time in the power saving state, wherein the extension control unit extends the sleep transition time for the power saving state in which a frequency of the staying time that occurs consecutively in a short time exceeds an allowable frequency.

2. The image forming apparatus according to claim 1, wherein the extension control unit extends the sleep transition time whenever the frequency of the power saving state in which the staying time being short appears in succession exceeds an allowable frequency while the predicted power consumption amount does not exceed the TEC value corresponding to the specific period.

3. The image forming apparatus according to claim 1, wherein the frequency of the power saving state in which the state staying time being short appears in succession is incremented continually whenever the state staying time in the power saving state becomes less than a threshold time until the state staying time in the power saving state becomes equal to or larger than the threshold time, the extension control unit suspends an extension of the sleep transition time until the predicted power consumption amount fails to exceed the TEC value corresponding to the specific period, if the frequency of that the power-saving state in which the state staying time being short appears in succession exceeds the allowable frequency and concurrently if the predicted power consumption amount exceeds the TEC value corresponding to the specific period time.

4. The image forming apparatus according to claim 1, wherein the extension control unit selects a sleep transition destination to which the sleep transition time is extended based on a sleep transition history if there are a plurality of the sleep transition destinations in the power saving state.

5. The image forming apparatus according to claim 2, wherein a transition to enter the power saving state can be set in a plurality of stages according to a degree of the limitation of the power supply destinations, and the allowable frequency is set to be smaller as the limitation degree of the power supply destinations becomes larger.

* * * * *